(12) United States Patent
Noldus

(10) Patent No.: US 8,611,880 B2
(45) Date of Patent: Dec. 17, 2013

(54) ROUTING CALL TO UMA-CAPABLE TERMINALS USING A GEOGRAPHIC NUMBER

(75) Inventor: Rogier Noldus, BM Goirle (NL)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 426 days.

(21) Appl. No.: 12/668,781

(22) PCT Filed: Jul. 13, 2007

(86) PCT No.: PCT/NL2007/050351
§ 371 (c)(1),
(2), (4) Date: Jan. 19, 2010

(87) PCT Pub. No.: WO2009/011564
PCT Pub. Date: Jan. 22, 2009

(65) Prior Publication Data
US 2010/0297989 A1    Nov. 25, 2010

(51) Int. Cl.
*H04M 3/32* (2006.01)
(52) U.S. Cl.
USPC ........ 455/417; 455/426.1; 455/411; 370/356; 370/395.2; 719/313
(58) Field of Classification Search
USPC ............... 455/417, 432.1, 426.1, 456.1, 436, 455/435.1, 67.11, 161.1, 166.1, 411, 410; 370/338, 328, 331, 332, 395.31, 407, 370/432, 492, 465, 437, 395.2, 356; 711/144, 119, 141, 148, 145; 709/215, 709/213, 216; 726/2, 8; 719/313
See application file for complete search history.

(56) References Cited

U.S. PATENT DOCUMENTS

| | | | | |
|---|---|---|---|---|
| 5,758,281 A | * | 5/1998 | Emery et al. | 455/428 |
| 6,434,126 B1 | * | 8/2002 | Park | 370/328 |
| 7,639,647 B2 | * | 12/2009 | Dantu et al. | 370/331 |
| 7,640,008 B2 | * | 12/2009 | Gallagher et al. | 455/414.1 |
| 8,032,133 B2 | * | 10/2011 | Niemela et al. | 455/426.1 |
| 8,064,882 B2 | * | 11/2011 | Shatzkamer et al. | 455/411 |
| 2006/0172732 A1 | * | 8/2006 | Nylander et al. | 455/433 |
| 2006/0205404 A1 | * | 9/2006 | Gonen et al. | 455/432.1 |

(Continued)

FOREIGN PATENT DOCUMENTS

| | | |
|---|---|---|
| EP | 1804435 A1 | 7/2007 |
| WO | 9742771 A2 | 11/1997 |

(Continued)

*Primary Examiner* — Mahendra Patel
(74) *Attorney, Agent, or Firm* — Coats and Bennett, P.L.L.C.

(57) ABSTRACT

The invention relates to a method of routing a call made to a fixed telephone number of a UMA-subscriber in a mobile telecommunications network comprising a first and a second switching node and a location server. Location information of said UMA-subscriber is acquired wherein said location information comprises a location area code or a combination of location area code and cell identifier associated with a serving BSC or a serving GANC. The call is connected to the UMA-subscriber when the location area code or combination of location area code and cell identifier is associated with one of a group of GANCs, or connected to an alternative destination, such as a voicemail service, if the location area code or combination of location area code and cell identifier is not associated with said one of a group of GANCs. The methods described in the present invention disclosure allow for very efficient offering of UMA in combination with geographic numbers.

27 Claims, 6 Drawing Sheets

(56) References Cited

U.S. PATENT DOCUMENTS

| | | | |
|---|---|---|---|
| 2006/0223498 A1* | 10/2006 | Gallagher et al. | 455/410 |
| 2008/0016515 A1* | 1/2008 | Naim et al. | 719/313 |
| 2008/0031214 A1* | 2/2008 | Grayson et al. | 370/342 |
| 2008/0130628 A1* | 6/2008 | Lin et al. | 370/352 |

FOREIGN PATENT DOCUMENTS

| | | |
|---|---|---|
| WO | 01/20945 A1 | 3/2001 |
| WO | 2006092733 A1 | 9/2006 |
| WO | 2007076410 A2 | 7/2007 |
| WO | 2009011564 A1 | 1/2009 |

\* cited by examiner

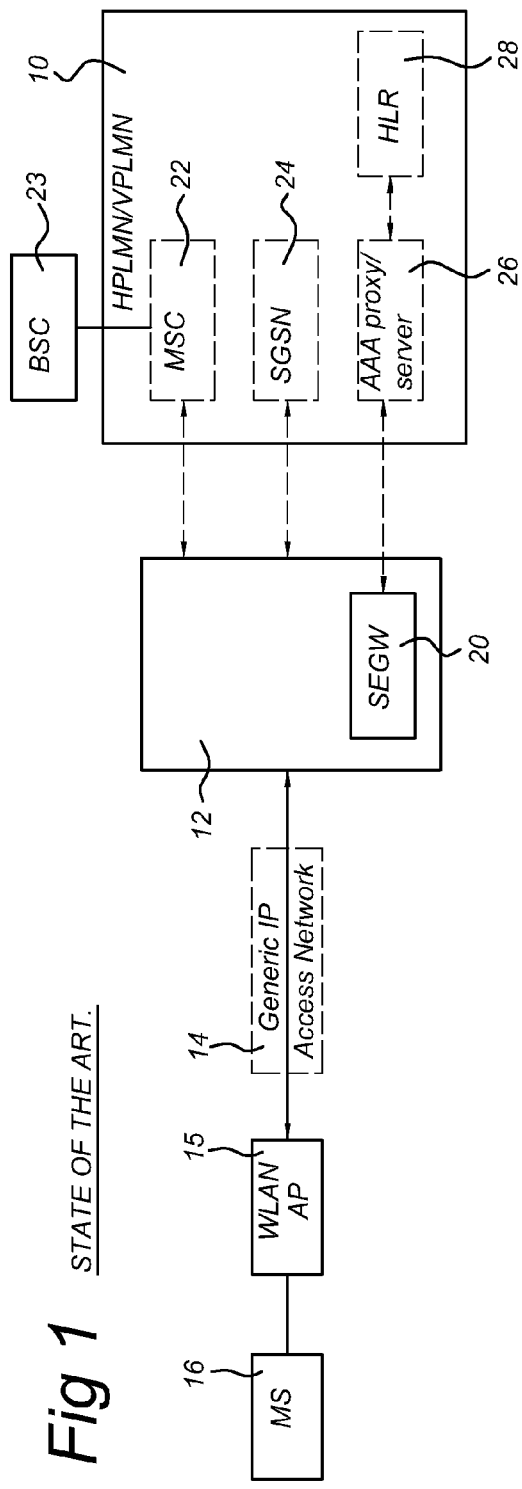
Fig 1  STATE OF THE ART.
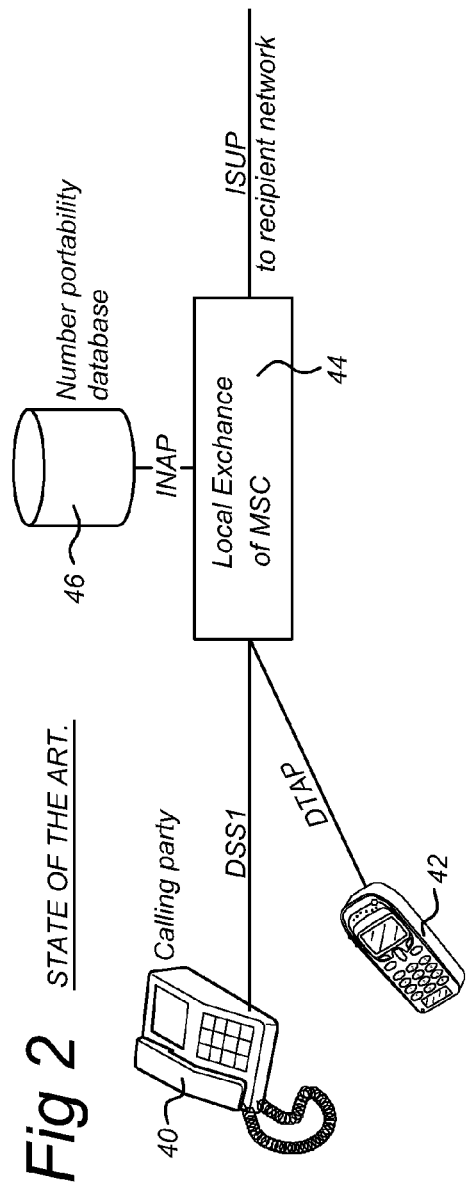
Fig 2  STATE OF THE ART.

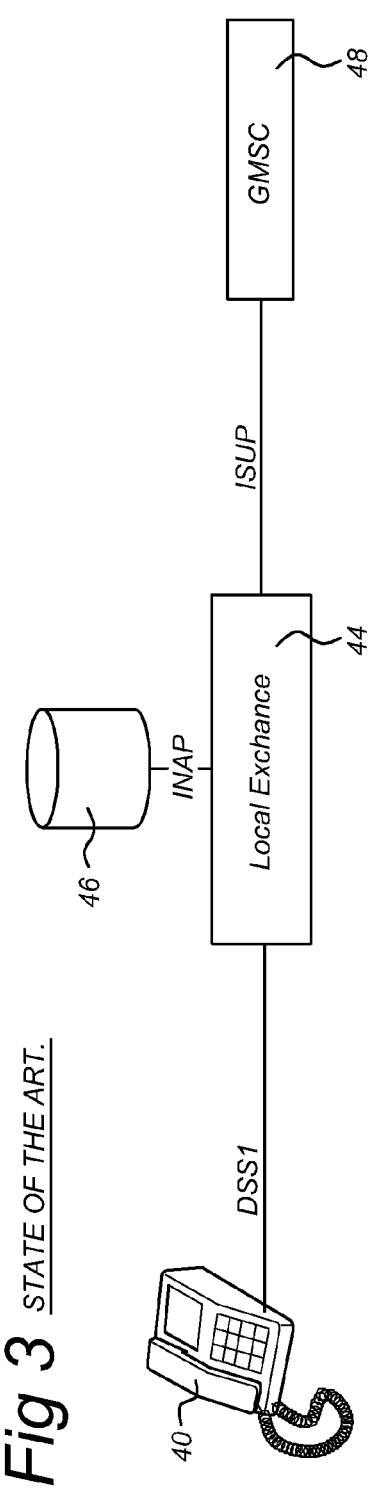
Fig 3 STATE OF THE ART.
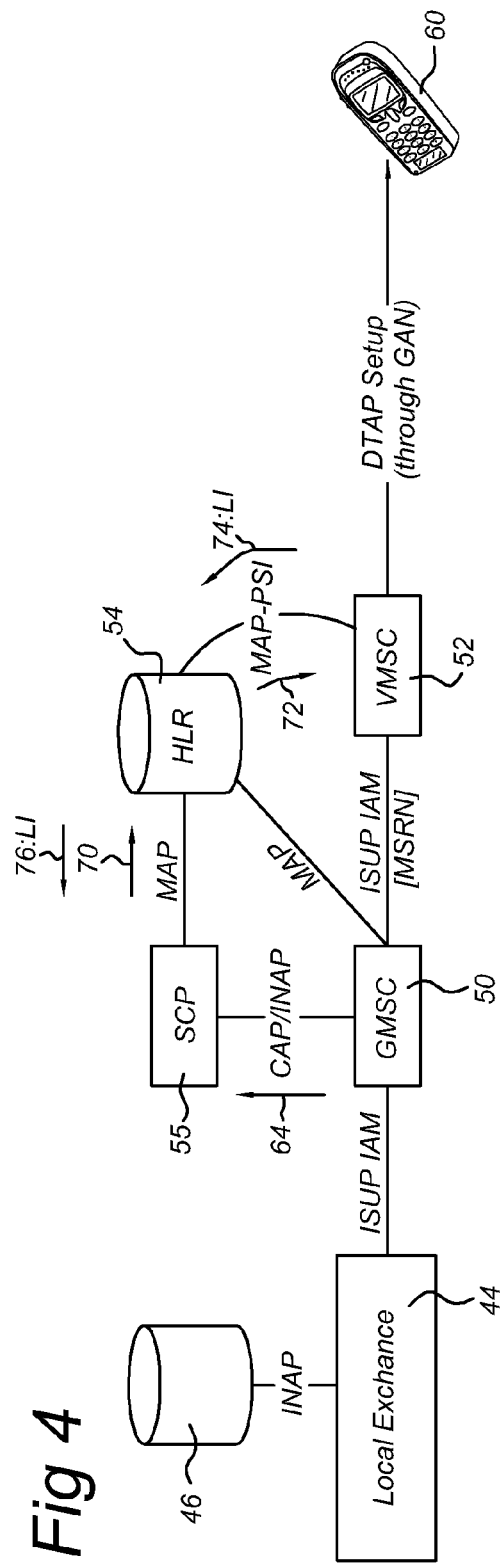
Fig 4

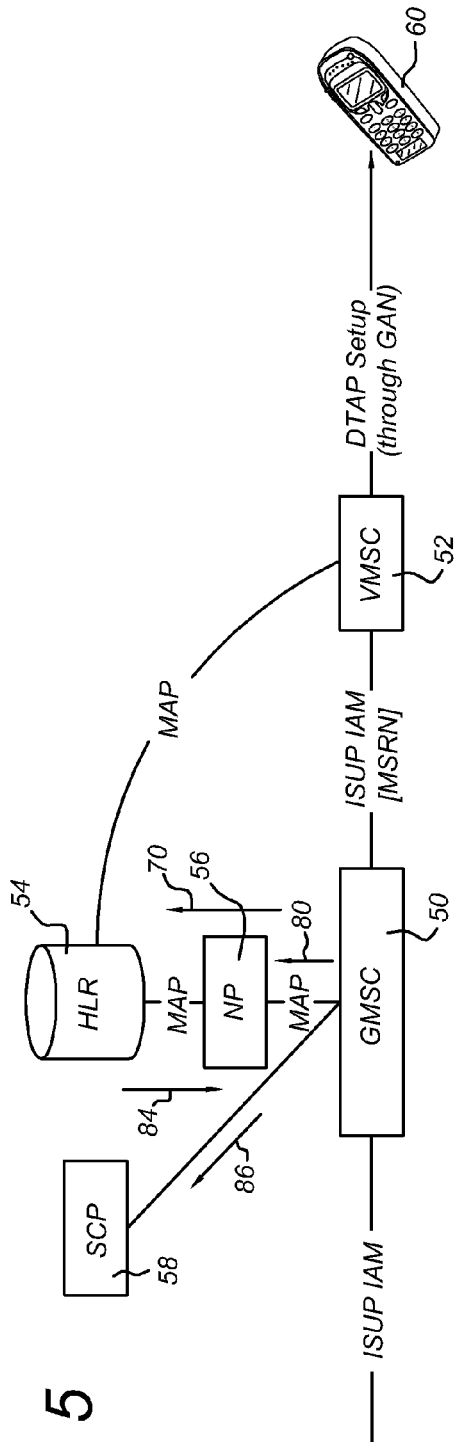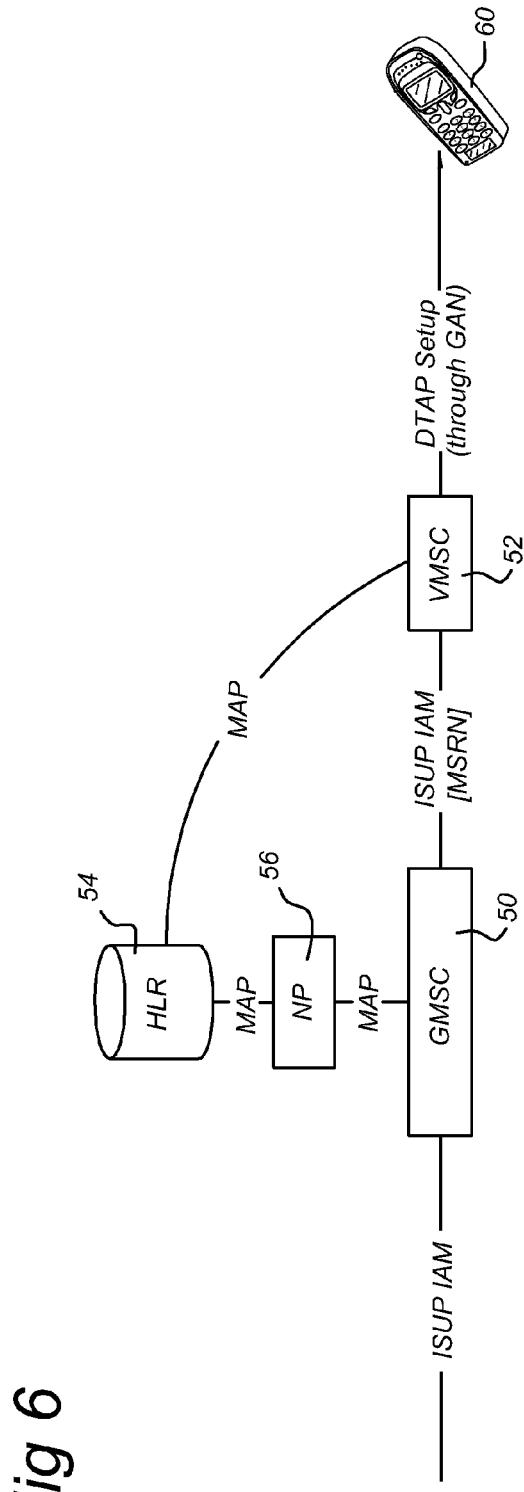
Fig 5
Fig 6

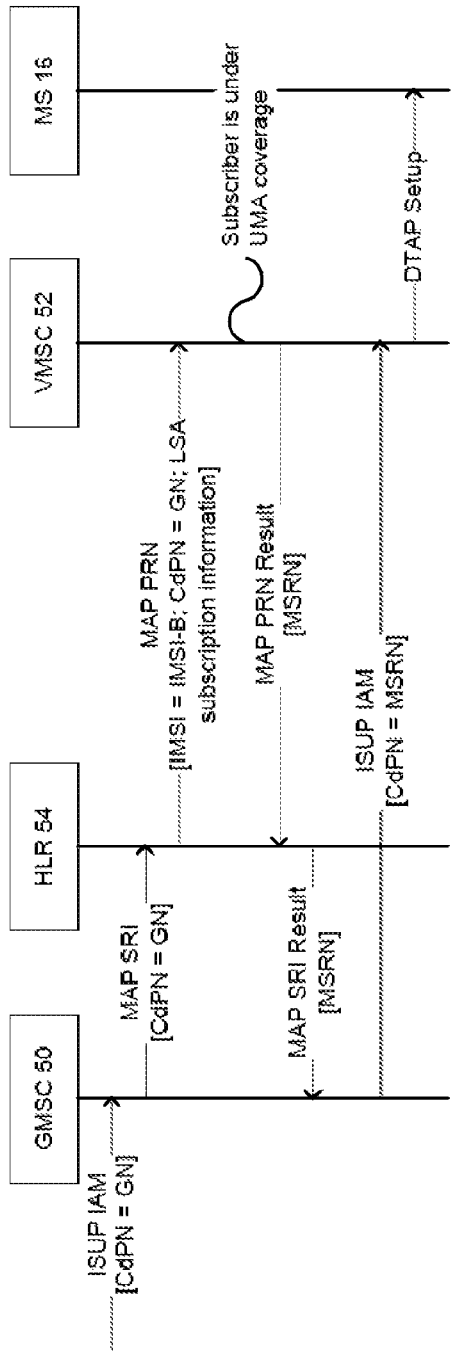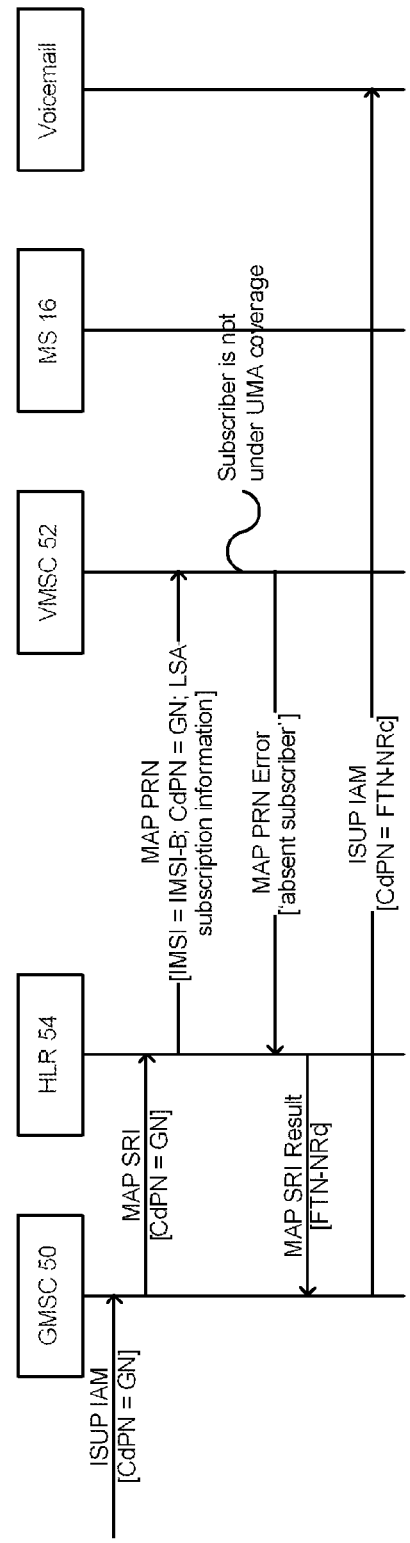
Fig 7
Fig 8

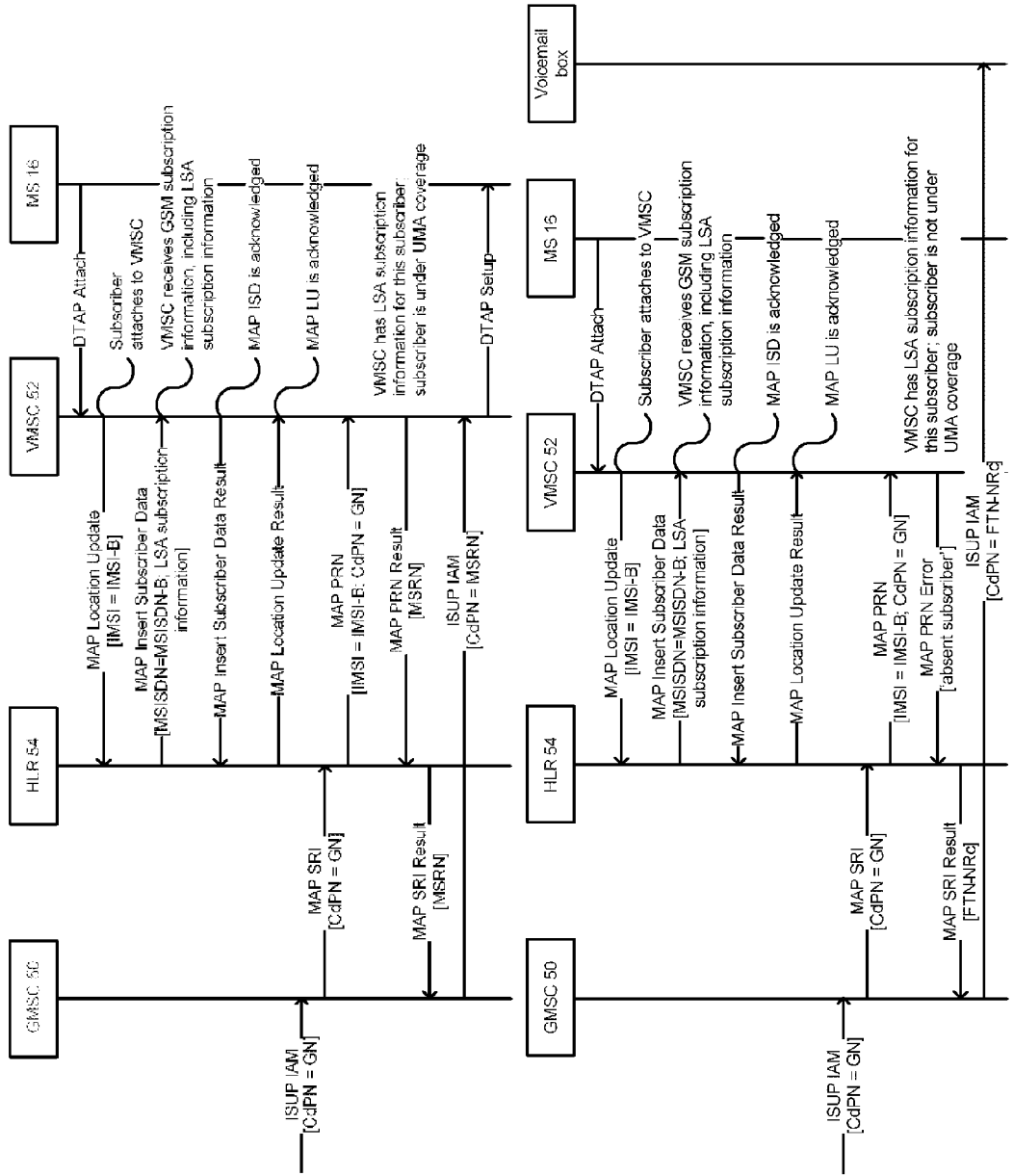

ROUTING CALL TO UMA-CAPABLE TERMINALS USING A GEOGRAPHIC NUMBER

TECHNICAL FIELD

The present invention relates to routing calls in mobile telecommunication networks. More particularly, it relates to a method of routing a call made to a UMA-capable terminal in a mobile telecommunications network using a geographic number. It also relates to network nodes for performing (part of) the method.

BACKGROUND

Unlicensed Mobile Access (UMA) allows for access to a GSM core network by means of Wireless LAN (WLAN) or by means of Bluetooth. The UMA standard is developed by the UMA Technology Group (www.umatechnology.org). The UMA standard is since adopted by 3GPP and further developed under the name Generic Access Network (GAN); however, the term UMA is more commonly used than GAN. UMA is specified in 3GPP TS 43.318 and in 3GPP TS 44.318.

Dual mode handsets containing both GSM radio and WLAN radio may access the GSM core network through GSM Radio Access Network (RAN) or through WLAN. WLAN access to the GSM core network may be used at a subscriber's home, in a subscriber's office and near designated public WLAN access points.

Recently in The Netherlands, the "At Home" service (@home; also known as 'Unique') has been launched. Subscribers of the @home service use a dual mode handset (GSM access and UMA access) for telecommunication services, and are referred to as GSM/UMA subscribers. Instead of GSM, UMTS may be used in combination with UMA access. In that case, subscribers will be referred to as UMTS/UMA subscribers. Below, the GSM/UMA or UMTS/UMA subscribers are simply referred to as 'UMA-subscribers' or just 'subscribers'. The following rules with respect to numbering are applied by the provider of the @home service:
  the subscriber may be contacted on her Mobile Subscriber ISDN Number (MSISDN), irrespective of the location where she is and irrespective of the access through which she is currently registered with the MSC;
  the subscriber also has a geographic number assigned to her; this geographic number forms part of the Public Switched Telephone Network (PSTN) fixed network numbering plan. She may be contacted on that number only when she is attached to the GSM network via a WLAN access point.

In a co-pending application PCT/NL2006/050279 filed in the name of the same applicant, a method is described that ensures that calls that are directed to the subscriber's geographic number are delivered to that subscriber only when she is registered to the MSC through WLAN access at that moment. The solution described in PCT/NL2006/050279 entails the following aspects:
  when the subscriber is registered to the MSC through WLAN access, this is marked in a subscriber database of the operator;
  when a call is established to the subscriber using the geographic number, the call is handled in the PSTN and an Intelligent Network (IN) service is triggered in the PSTN;
  the PSTN checks whether the subscriber is currently attached via WLAN; if yes, then the IN service connects the call to the subscriber's MSISDN; otherwise, the IN service forwards the call to voicemail.

In the method described above special IN handling is required in the PSTN even though the call is actually destined for a GSM network subscriber. Furthermore, number translation needs to be done. As a result, once the call arrives at the GSM network, it is no longer known whether the subscriber was called on her MSISDN or on her geographic number. Also, a special @home location server is required.

A goal of the present invention is to improve the method described above.

This goal is achieved by providing a method of routing a call made to a fixed telephone number of a UMA-subscriber, according to one or more of the claims. In a particular embodiment the telecommunications network further comprises a Signalling Relay Function (SRF), wherein the first switching node:
  receives an ISUP IAM message from a third switching node, the ISUP IAM message comprising a called party number comprising the fixed telephone number and a routing prefix;
  sends a MAP SRI message to the location server;
  receives subscription information and location information from the location server;
  sends a trigger message to the service control entity, using the received subscription information, the trigger message comprising the location information, and wherein the SRF:
  stores a list comprising a fixed number and an associated location server for the UMA-subscriber;
  receives a MAP SRI message from the first switching node, the MAP SRI message comprising the fixed telephone number;
  forwards the MAP SRI message to the location server associated with the fixed telephone number using the list;
  receives a MAP SRI result message from the location server, the MAP SRI result message containing subscription information and location information of the subscriber;
  forwards the subscription information and location information to the first switching node.

The advantages of this SRF are that by provisioning a fixed number in the SRF and associating with this fixed number an address of a location server (i.e. HLR), this fixed number may practically be treated as an MSISDN. Terminating call handling for calls to a UMA-subscriber may be generic for the following two cases:
  (1) the UMA-subscriber is publicly known by a fixed number ('fixed number' being a number belonging to a number range that is originally allocated to fixed (land line) telephones);
  (2) the UMA-subscriber is publicly known by a mobile number ('mobile number' being a number belonging to a number range that is originally allocated to mobile (cellular) telephones);

A subscriber of this mobile telecommunication network may have a fixed number and a mobile number associated with her, whilst having one mobile phone, one subscription and one set of service data.

In another embodiment, the mobile telecommunications network further comprises a service control entity, which:
  runs an IN service;
  receives location information of a UMA-subscriber comprised in an IN trigger message; and
  uses the location information for its service logic processing.

If the subscriber is found to be under UMA access, a home zone indicator can be placed in a Call Detail Record, wherein the home zone indicator indicates to a billing system that the rate of the call must be adapted. The IN service may be a prepaid service or a VPN service. The charging of the call will not just be based on the location of the called subscriber, but also on the number by means of which this subscriber was called. That is a specific enhancement to prepaid and VPN service logic handling, compared to current methodology.

Such a method may be implemented in a network without impacting the GSM core network entities. There are no requirements for enhanced Signaling relay function.

Further, in one or more embodiments, the claimed method may be applied without the need for invoking a dedicated IN service. It may be used in combination with existing IN service such as prepaid or VPN.

Further, in one or more embodiments of the method, the second switching node may apply for example adapted ring signal when the destination subscriber is under UMA access and is called on her (the subscriber's) fixed number.

In yet a further aspect, the invention relates to a service control entity for providing intelligent network services to users of a mobile telecommunications network.

The invention also relates to a service control entity for providing intelligent network services to users of a mobile telecommunications network.

The invention also relates to a switching node for use in a mobile telecommunications network.

Furthermore, the invention relates to a location server for use in a mobile telecommunications network.

Finally, in one or more embodiments, the invention relates to a computer program product comprising computer executable code, which when loaded on a computer system, allows the computer system to execute the method as described above.

BRIEF DESCRIPTION OF THE DRAWINGS

The present invention will be discussed in more detail below, using a number of exemplary embodiments, with reference to the attached drawings, in which:

FIG. 1 schematically shows part of a telecommunication network according to an embodiment of the invention;

FIG. 2 schematically shows a Local Exchange and a number portability database according to the state of the art;

FIG. 3 shows an example of number portability for a call to a fixed telephone number;

FIG. 4 depicts part of a possible architecture of a telecommunication network according to a first embodiment of the invention;

FIG. 5 depicts part of a possible architecture of a telecommunication network according to a second embodiment of the invention;

FIG. 6 depicts part of a possible architecture of a telecommunication network according to a third and fourth embodiment of the invention;

FIG. 7 shows an example of a signal sequence diagram of a successful call establishment according to the third embodiment;

FIG. 8 shows an example of a signal sequence diagram of an unsuccessful call establishment according to the third embodiment;

FIG. 9 shows an example of a signal sequence diagram of a successful call establishment according to the fourth embodiment;

FIG. 10 shows an example of a signal sequence diagram of an unsuccessful call establishment according to the fourth embodiment;

DETAILED DESCRIPTION OF THE INVENTION

Figure 11:
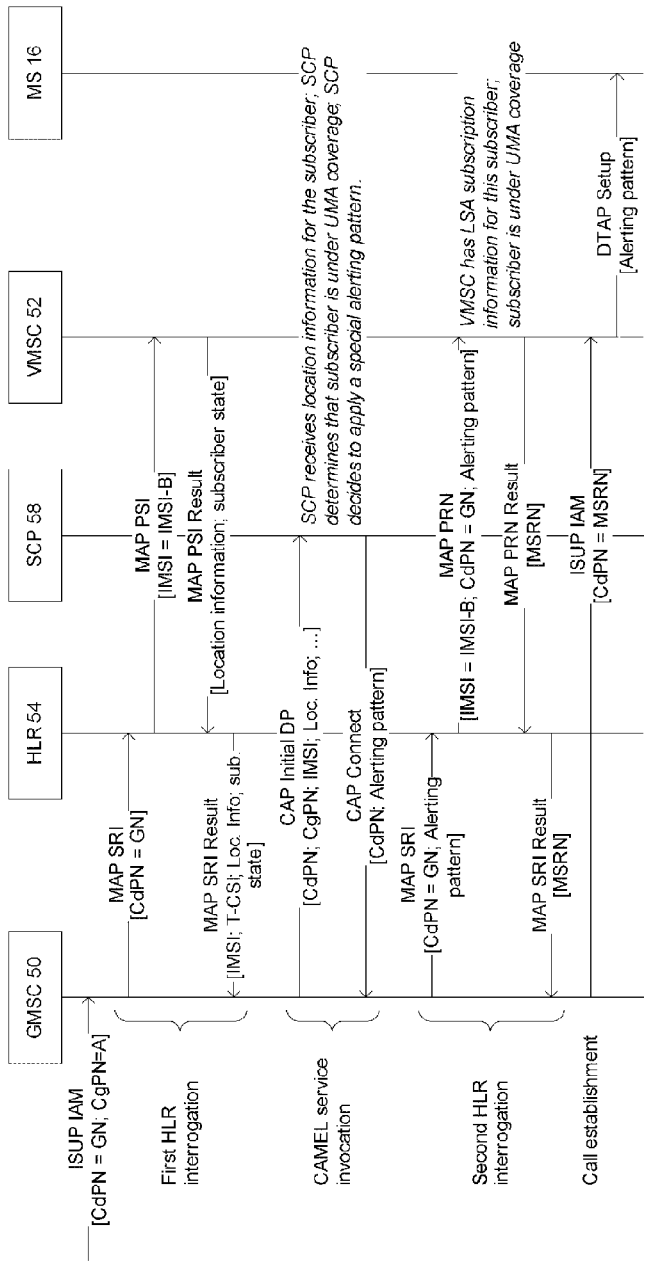
FIG. 11 shows an example of a signal sequence diagram of a successful call establishment according to the fourth embodiment in which an IN service is invoked.

FIG. 1 depicts part of a telecommunication network according to the state of the art, comprising a PLMN 10, a Generic Access Network Controller (GANC) 12 and a generic IP access network 14. An example of the generic IP access network is the Internet in combination with SDL access. A Mobile Station (MS) 16 can be connected to the PLMN 10 via a WLAN access point 15 and the GANC 12. The GANC 12 amongst others comprises a Security gateway (SEGW) 20. The PLMN 10 comprises several types of communication nodes/functions only one of each is shown is FIG. 1. FIG. 1 shows a Mobile services Switching Center (MSC) 22, a Base Station Controller (BSC) 23, a SGSN 24, an AAA Proxy/AAA Server 26 and a Home Location Register (HLR) 28.

In the present invention, the MS 16 is a UMA-capable terminal which comprises GSM/UMTS communication equipment and also UMA capabilities, such as WLAN access. In the case of UMA access, the UMA-capable terminal 16 gains access to the GSM/UMTS core network (i.e. PLMN 10) through the GANC 12. The GANC 12 behaves as a Base Station Controller (BSC) towards the MSC to which it is connected. Below, the GANC 12 is also referred to as UMA network controller (UNC) 12.

The present invention makes use of a number of location related definitions: Cell global identifier (CGI), Location area identifier (LAI), Location number (LN) and Location information (LI). These definitions are specified by 3GPP as follows:

$$CGI=MCC+MNC+LAC+CI \qquad (1)$$

with MCC=mobile country code;
MNC=mobile network code;
LAC=location area code;
CI=cell identifier.

The CGI is a globally unique identifier for a cell in a GSM radio access network. See 3GPP TS 23.003 v7.3.0, section 4.3.1.

$$LAI=MCC+MNC+LAC \qquad (2)$$

The LAI is a globally unique identifier for a location area in a GSM radio access network. A LAI comprises one or more CGI's. See 3GPP TS 23.003 v7.3.0, section 4.1.

The LN is an E.164 number that is used to identify a location in a mobile network. The LN is structured as follows:

$$LN=CC+NDC+LSP \qquad (3)$$

with CC=country code;
NDC=national destination code;
LSP=locally significant part.
See also 3GPP TS 23.003 v7.3.0, section 4.5.

The Location Information (LI) is a set of location elements describing the location of a subscriber in a mobile network. Depending on the type of mobile network, the LI consist of one or more of the following elements:
CGI or LAI
LN
VLR address
The above list is not exhaustive. For a complete description of LI, refer to 3GPP TS 23.018 v7.4.0, section 8.3.5.1. It will further be known to the person skilled in the art that in a UMTS network, a Service area code (SAC) may be used instead of a Cell identifier (CI).

When a subscriber using the MS 16, see FIG. 1, is attached to the MSC 22 of PLMN 10 via WLAN (i.e. UMA access), then this is reflected in her CGI, consisting of the MCC, MNC, LAC and CI, see formula (1). The UMA access for the MS 16 is gained through the GANC 12. The GANC 12 behaves as a BSC towards the MSC 22 to which it is connected. The GANC 12 has a LAC associated with it. The LAC of the GANC 12 together with an MCC and MNC of the PLMN 10 form a LAI associated with the GANC 12. When the subscriber attaches to the MSC 22 through the GANC 12, then her CGI is reported to the MSC 22. In the case of GSM access, the BSC 23 takes the place of the GANC 12. The BSC 23 also has a LAC allocated to it, which is reported to the MSC 22. By inspection the LAC of the subscriber's CGI, or the combination of the LAC and the CI of the subscriber's CGI, the MSC 22 is able to determine whether the subscriber is currently attached via GSM or via WLAN.

The BSC 23 controls a number of Base Transceiver Stations (BTSs), not shown in FIG. 1. As long as the subscriber camps on a BTS connected to a particular BSC, the LAC of the subscriber, stored in the MSC 22, will remain unchanged. When the subscriber moves to another cell connected to the same BSC, then the change in cell will not be reported to the MSC 22. This has the following effect:

when the subscriber establishes a call, her current CGI will be reported to the MSC 22; hence, services like IN or location-dependent functionality in the MSC 22 have the current CGI available;

when the subscriber receives a call, the MSC 22 does not have the subscriber's current CGI available; however, the LAI of the (receiving) subscriber is stored in the MSC 22 and reflects the BSC to which the cell is connected on which the (receiving) subscriber is currently camping. The (receiving) subscriber's current cell is known only after paging response.

The GANC 12 has its own LAI. Therefore, the following applies for the subscriber when using UMA access:

when the subscriber establishes a call through the GANC 12, her CGI is reported to the MSC 22. Services like IN or location-dependent functionality in the MSC 22, can derive from the LAI value that the subscriber is currently served by a GANC as opposed to a BSC;

when the subscriber receives a call, the MSC can derive from the stored LAI that the subscriber is currently served by a GANC as opposed to a BSC.

This distinction between "normal GSM access" and "UMA access", as derived from the LAI, will be used for the present invention, specifically, to decide whether a particular call may be delivered to a subscriber.

Nowadays, so-called "Fixed-mobile portability" is applied to calls directed to a fixed number, also referred to as "geographic number" (GN) of the subscriber. Querying a number portability (NP) database during call establishment is a common method for number portability, especially for calls to fixed numbers. A subscriber with a dual-mode handset (i.e. UMA/GSM handset) may receive a call directed to a fixed number, on the dual-mode handset. However, in the @home service a special condition is that the subscriber must be currently served by a GANC, such as the GANC 12 of FIG. 1. Practically, this condition implies that the subscriber must be registered to the MSC through the WLAN access point 15 in order to receive a call that is established to the subscriber's fixed number. When the called subscriber is registered to the MSC through the WLAN access point 15, the call is routed to the MSC 22 in the PLMN 10 where the subscriber is currently registered and the call is offered to the subscriber through the MSC 22 and the GANC 12. This leads to the following observation:

from a service point of view, the subscriber is receiving the call in her 'fixed location'; hence, a call to a 'fixed number' is still delivered to a 'fixed location'.

from a network routing point of view, the call to a fixed number is delivered to a GSM phone; so, this may be considered fixed-mobile number portability, even though it is not experienced as such by calling and called party.

Fixed-mobile number portability is commonly accomplished by a technique that is referred to as 'number portability check at the source'. FIG. 2 reflects this principle. A calling party using a fixed telephone 40, or a mobile phone 42, initiates a call to a ported number. A local exchange (LE) 44 or a MSC 44 performs regular call handling and number analysis. When the LE/MSC 44 detects that the called number falls within the number portability number range, i.e. the number may have been ported, then the LE/MSC 44 performs a number portability (NP) query in a NP database 46. The NP database 46 contains a route number for each ported number. If the called number is found to be ported, then the NP database 46 returns the route number to the LE/MSC 44. The LE/MSC 44 establishes the call to the called number, using the received route number as a prefix. The route number points to a Gateway node of the recipient network, i.e. the network that the called party belongs to.

When the call to a ported subscriber is initiated from a foreign network, then the number portability check will be performed by a gateway exchange or other designated exchange at the country border or at the home network border. When a call is initiated towards a UMA-subscriber using that subscriber's fixed number, then the afore-described NP check takes care that the call is routed to the PLMN that this subscriber belongs to. In the example of FIG. 3, the PSTN subscriber dials 08 404 2300. This number belongs to the fixed number range in Sweden (fixed number). The Local Exchange 44 performs NP query and receives a route number, 'DE' from the NP database 46. 'DE' points to the GSM network from TeliaSonera in Sweden. Hence, the LE routes the call to a GMSC 48 from TeliaSonera. The GMSC 48 handles the call further.

If, as is the case in the @home service, the UMA-subscriber may be contacted on her fixed number only when she is attached to the GSM network via a WLAN access point, the location of the UMA-subscriber must be known when setting up the call. Below, four embodiments will be described for delivering a call to a fixed number to the subscriber with reference to FIGS. 4-11.

FIG. 4 depicts part of possible architecture of a network according to a first embodiment of the invention. The telecommunication network comprises a first switching node, in this example GMSC 50, a second switching node, in this example Visited MSC (VMSC) 52, an HLR 54, an NP database 56 and an SCP 58 on which an IN service is loaded. It should be noted that instead of a HLR other location servers may be used. The SCP 58 is also just an example of the broader concept 'service control entity'.

A call is made to a GSM/UMA subscriber who is registered with the GSM network with terminal 60. In this example, the initiator of the call dials 08 404 2300. A prefix 'DE' is added to the called number as was explained above with reference to FIG. 3. According to this embodiment, the GMSC 50 applies number based IN service triggering for this call. The criterion for triggering the IN service on the SCP 58, see arrow 64, consists of the Route Number that was used to route the call to the GMSC 50, i.e. 'DE'. The IN service is provisioned with subscriber data, including the geographic number and the MSISDN. The IN service uses the subscriber's MSISDN for a MAP Any Time Interrogation (ATI) query to the HLR 54, see arrow 70, to obtain the subscriber's LI. The LI is returned to the IN service on the SCP 58, see arrow 76. The LI contains, amongst others, the CGI or LAI; the CGI or LAI contains, amongst others, the LAC, see formulas (1) and (2). The IN service deduces from the LAC whether the subscriber is attached to the MSC via WLAN. If this is the case, then the IN service delivers the call to the subscriber by providing the MSISDN of the subscriber to the GMSC 50. The GMSC 50 will now establish the call to the terminal 60 of the subscriber. The GMSC 50 applies normal GSM call handling to connect this call to the subscriber. I.e. the GMSC 50 sends MAP Send Routing Information (SRI) to the HLR 54 and the rest of a normal signalling procedure will be performed as will be known to the skilled person. If the subscriber has also subscribed to an IN service for terminating call handling, then the routing of the call from the GMSC 50 to the VMSC 52 may include the invocation of the subscribed IN service. For example, the subscriber may also have VPN service or other possible IN services.

If however the subscriber is found, by the IN service, to be served by GSM access, then the IN service on the SCP 58 connects the call to an alternative destination, such as a voicemail. Connecting the call to voicemail has the advantage that the calling party may leave a message behind. The called subscriber, i.e. the GSM/UMA subscriber, may receive an SMS informing her that a voice message has been deposited to her voicemail box. Since the call is not connected to the terminal 60 of the called party, she is not charged for costs that would have resulted from a connection via the GSM network.

FIG. 5 depicts possible architecture for a network according to a second embodiment of the invention. FIG. 5 resembles FIG. 4 except that communication to fetch location information of the called subscriber is performed differently. In this second embodiment, the GMSC 50 is configured to take an 'HLR route' for calls to numbers starting with specific prefix, e.g. 'DE'. 'Taking an HLR route' means that the GMSC 50 may conclude that the number belongs to this PLMN, so the GMSC 50 contacts the HLR 54 to obtain routing information, see arrow 80. Normally, a GMSC is configured to take an HLR route for MSISDNs of the network that the GMSC belongs to. However, according to this embodiment, the GMSC 50 is arranged to take an HLR route also for numbers starting with a specific prefix. The prefix will in that case not be included in the query to the HLR 54, i.e. the prefix will in that case not be included in MAP SRI. The MAP SRI that the GMSC 50 sends towards the HLR 54, see arrow 80, is intercepted by the NP database 56. The NP database 56 can be regarded as Signalling Relay Function (SRF), which is a standardised component for Mobile Number Portability (MNP). The NP database 56 takes care that MAP SRI is directed to the correct HLR. Hereto, the NP database 56 checks the called number, as included in MAP SRI and uses a table to obtain the address of the HLR to which the MAP SRI shall be sent. The NP database 56 may contain both the MSISDN and the fixed number for each @home subscriber. Hence, the MAP SRI for '08 404 2300' is sent to a designated HLR, namely the HLR 54 that contains the subscriber information for the called subscriber. According to the second embodiment, the HLR 54 has the 'dual number' feature. The subscriber has both MSISDN and a geographic number in her profile stored at the HLR 54. As a result, when the HLR 54 receives MAP SRI for the fixed number, it applies normal terminating call handling. The normal terminating call handling entails that the HLR 54 uses MAP Provide Subscriber Information (PSI) to VMSC 52 to obtain subscriber location information. The HLR 54 returns IN subscription information (such as Terminating CAMEL subscription information, T-CSI, as standardised for GSM/UMTS, or a vendor-specific information element) and the LI to the GMSC 50, see arrow 84. The GMSC 50 will then trigger the IN service on the SCP 58, see arrow 86. The service triggering includes the location information received from the HLR 54. The IN service that is now triggered uses the received LI to determine whether the subscriber is currently served by UMA access. If the subscriber is served by UMA, then the IN service allows the call to continue (IN service sends Continue operation to GMSC 50). The GMSC 50 continues establishing the call to the called subscriber. If it is found by the IN service that the subscriber is not served by UMA, then the IN service connects the call to an alternative destination, such as a voicemail.

FIG. 6 schematically depicts a part of a telecommunications network according to a third embodiment. The network of FIG. 6 resembles the network of FIGS. 4 and 5 except that the SCP 58 may be absent from the network (i.e. no IN service triggering needed). The third embodiment utilises the Localised services area (LSA) concept. LSA is specified in 3GPP TS 42.043 and 3GPP TS 43.073. The LSA concept entails that a subscriber gets different service levels, depending on a Local Service Area where the subscriber resides at that moment. The HLR 54 sends LSA subscription information to the VMSC 52 during a so-called Location update procedure and during a Restore data procedure as will be known to the skilled person. The LSA subscription information consists of area information (e.g. LAI associated with UMA access) and LSA restriction, indicating what restriction shall be applied when the subscriber's current area is not comprised in this area information. The subscriber may e.g. be restricted in establishing and/or receiving calls when in a specific 'area'. An 'area' is defined as a group of one or more cells.

The definition of a subscriber's local service area is static in the HLR 54 and semi-static in the VMSC 52. The 'static definition' in the HLR relates to the fact that the subscriber is provisioned in the HLR with local service area subscription information; this local service area subscription information remains in the HLR, even when the subscriber moves between MSCs and when the subscriber switches her phone off and on. The 'semi-static definition' in the VMSC relates to the fact that the VMSC contains the subscriber's local service area subscription information for as long as the subscriber is registered in that VMSC. When the UMA-subscriber is registered in the VMSC 52, she has certain LSA subscription information stored in that VMSC 52, resulting from the Location update procedure and Restore data procedure. The VMSC 52 applies the restriction as defined in the subscriber's LSA subscription information, when handling e.g. an incoming call. The VMSC 52 does not distinguish on the number on which the subscriber was called, i.e. whether the subscriber was called on her MSISDN or on her fixed number. The third embodiment offers a mechanism that results in the following:

when the subscriber is called on her fixed number, then the LSA subscription information for that subscriber will restrict call delivery to UMA access;

when the subscriber is called on her MSISDN, then no LSA restriction applies for the call.

According to this embodiment, the LSA subscription information of the UMA-subscriber as is sent to the VMSC 52, comprises location information with a LAI and comprises a restriction that shall be applied by the VMSC when the subscriber's current LAI differs from the LAI comprised in said LSA subscription information.

In the third embodiment, when the HLR 54 is handling a terminating call for a UMA-subscriber that is called on her fixed number, then the HLR 54 includes UMA-specific LSA subscription information in a MAP Provide Roaming Number (PRN) message to the VMSC 52. The HLR 54 may include the following two information elements in the MAP PRN message:

the Called party number (CdPN); this is the fixed number that was used to call the subscriber, and LSA subscription information, indicating that UMA access is required for the subscriber in order to offer the call to her.

If the subscriber is currently not attached to the VMSC 52 via WLAN, i.e. not under UMA access, which can be derived from the subscriber's LI stored in VMSC 52, then the VMSC 52 will not allocate a Mobile Station Roaming Number (MSRN). As a result, the HLR 54 applies early call forwarding, using the subscriber's Call Forwarding on Not Reachable (CF-NRc) number.

The VMSC 52 applies the specific LSA subscription information for one specific call. If the VMSC 52 determines that the subscriber is currently not under UMA access, then the VMSC 42 will not deliver the call. More specifically, the VMSC 52 will in this case not allocate a MSRN for this call, as a result of which the call can't be delivered to the intended subscriber. This embodiment entails further that the LSA subscription information of the subscriber is temporarily sent from the HLR 54 to the VMSC 52, for the handling of one call only. The temporarily sending of the LSA subscription information to the VMSC 52 is done by way of an enhancement to the standard MAP PRN message, as described above. When the subscriber is roaming outside the Home PLMN, then the HLR 54 may consider the subscriber to be detached for calls to her fixed number.

FIG. 7 shows an example of a signal sequence diagram for the third embodiment. The HLR 54 includes LSA subscription information in the MAP PRN message, as well as the called number (i.e. the fixed number). In this example, the subscriber is currently under UMA coverage, so the VMSC 52 returns a MSRN to the HLR 54. The HLR 54 will then return the MSRN to the GMSC 50. This will lead to a connection to the MS 16, see FIG. 7.

FIG. 8 shows another example of a signal sequence diagram for the third embodiment. The HLR 54 includes LSA subscription information in the MAP PRN message, as well as the called number (i.e. the fixed number). In this example, the subscriber is currently not under UMA coverage, so the VMSC 52 does not return a MSRN but instead returns a MAP PRN Error message. The HLR 54 will then return a registered Forwarded-To-Number-Not Reachable (FTN-NRc) to the GMSC 50. The GMSC 50 will now send an ISUP IAM with the FTN-NRc as the CdPN. This will lead to a connection to a voicemail service.

In a fourth embodiment, the LSA concept is used as well but in a different way than in the third embodiment mentioned above. According to the fourth embodiment, the subscriber has LSA subscription information in her profile in the HLR 54, with an LSA setting including an additional field to indicate that the LSA policy is dependent on the number on which the subscriber is called. When the subscriber is called on her MSISDN, then no restriction applies for delivering the call. When the subscriber is called on her fixed number, then the VMSC 52 applies the restriction defined in the LSA subscription information; in that case, the call will be delivered to the subscriber only when she is currently served by UMA. In this fourth embodiment, the LSA subscription information of the subscriber is part of the GSM subscription data sent in a MAP Insert subscriber Data (ISD) message. As a result, the LSA setting for the subscriber is present in the VMSC 52; therefore the HLR 54 does not need to include the LSA setting in MAP PRN for every call as was the case in the third embodiment. To facilitate the VMSC 52 to make the LSA-handling dependent on the called party number, the called party number is included in the MAP PRN. Including the called party number in MAP PRN is standardised methodology defined in 3GPP TS 29.002.

When the subscriber is called on her fixed number, the HLR 54 may attempt to apply the LSA restriction as defined in the LSA subscription information. The HLR 54 is aware of the VMSC where a subscriber is currently registered. If the HLR determines that the LSA does not fully or partially fall within the VMSC service area, then the HLR 54 may conclude that the subscriber is currently not in her LSA. In such case, the HLR 54 may apply the LSA restriction, which will, as described above, have the effect that the call will not be delivered to the subscriber.

One example of a case that the HLR 54 can determine that the LSA does not fully or partially fall within the service area of the VMSC 52 where a subscriber is currently registered, is the case that a subscriber is roaming outside the Home PLMN, presuming that the area defined in the subscriber's LSA subscription information fully falls within the HPLMN. In that case, the HLR 52 will apply the LSA restriction, which will have the effect that the call will not be delivered to the subscriber. Depending on forwarding subscription data, the call may be forwarded to voicemail.

When the VMSC 52 applies LSA for a call and the LSA setting of the subscriber stipulates that the call can't be delivered to the subscriber, then the VMSC 52 will not assign a MSRN for the call. As a result, the HLR 54 returns the Forwarded-to number, if available, to the GMSC 50. The GMSC 50 will then forward the call to voicemail.

FIG. 9 shows an example of a signal sequence diagram for the fourth embodiment. The VMSC 52 receives the subscriber's LSA information during a location update procedure, including an indication that the VMSC 52 shall apply the LSA only when the subscriber is called on her geographic (i.e. fixed) number (GN). The VMSC 52 determines that the subscriber is currently under UMA coverage, so the VMSC 52 returns a MSRN. The HLR 54 forwards the MSRN to the GMSC 50. In FIG. 10, the VMSC 52 concludes that the UMA-subscriber is not under UMA coverage. It will send a MAP PRN error message to the HLR 54 which sends a FTN-NRc as the result back to the GMSC 50. The GMSC 50 will then connect to a voice mail service.

FIG. 11 shows another example of a signal sequence diagram for the fourth embodiment in which an additional IN service is invoked. In this example, the subscriber is currently served by UMA, so the VMSC 52 returns a MSRN and the call is established to the subscriber. The IN service loaded on the SCP 58, see FIG. 5, or on another SCP (not shown), receives the location information in the service invocation and may apply e.g. specific charging for receiving a call when served by UMA. The IN service may use the received location information to determine that the subscriber is currently served by UMA, so returns an alerting pattern to the GMSC 50. The alerting pattern is conveyed to the VMSC 52 through the MAP signaling via the HLR 54. The VMSC 52 will then include the alerting pattern in the DTAP Setup message to the called party, so that the called may get an audible indication that she is called on her geographic number. The transport of the alerting pattern as described above is standardized for GSM and will as such be known to the skilled person. The MAP Provide subscriber info (PSI), reflected in FIG. 11, is used to retrieve the subscriber's location information prior to IN service invocation. The method for controlling UMA as described for the third and fourth embodiment, may be used in combination with IN service(s), such as Personal greeting service (PGS). It is emphasized that in the third and fourth embodiment the IN service(s) are invoked and executed independently of the UMA control. I.e. the UMA control does not depend on IN service and the IN service(s) are not affected by UMA.

For the roaming leg (i.e. the call leg between the GMSC 50 and the VMSC 52) a personal greeting service may be invoked. The personal greeting may be enhanced in the following manner:

The personal greeting may be adapted to the number that the called subscriber was called on, i.e. when called on geographic number a different greeting is played than when called on MSISDN.

The personal greeting may be adapted to the location/access of the called party, i.e. when the subscriber is served by UMA access a different greeting is played than when the subscriber is served by GSM access.

It is emphasized again that the UMA access control as described in the third and fourth embodiment may also work without any IN services.

An operator may want to allow that a call to the geographic number is connected to the UMA subscriber also when she is currently not served by UMA. This requirement may be accomplished by not using the LSA method as described for the third and fourth embodiment. The HLR 54 will establish the terminating call, regardless of the current location and access technology of the subscriber. However, the called party shall in that case pay terminating call charges. The called number, in the above example the geographic number, is placed in a Call Detail Record (CDR) generated by the GMSC 50. The called number is also placed in the CDR generated by the VMSC 52. The CDR generated by the VMSC 52 also contains location information of the called party. Off-line CDR correlation, using established techniques, facilitates that the called party pays terminating call charging. The called number may also be reported to the IN service logic that is invoked from the GMSC 50. Hence, if on-line charging is used, then the service logic can use the location information (LI) and called number to determine that the called subscriber shall pay terminating call charging.

Figure 12:
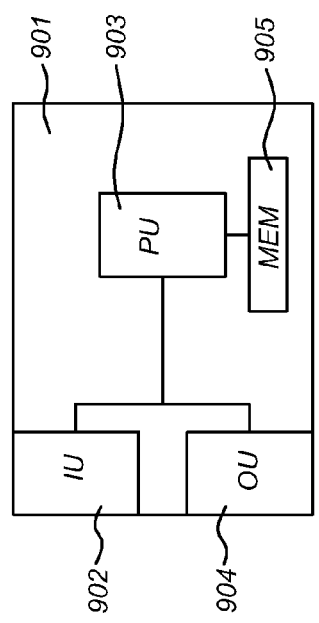
FIG. 12 shows a simplified form of a possible structure of a switching node, a location server or a service control unit.

The MSCs 50, 52, the SCP 58 and the HLR 54 may be implemented as network units 901, the structure of which is shown in simplified form in FIG. 12. The network unit 901 comprises a processing unit 903 connected to an input unit 902. Furthermore, the processing unit 903 is connected to an output unit 904. These allow the processing unit 903 to communicate with other network units 903 or other elements in the communication network. The processing unit 903 may comprise a general purpose central processing unit (CPU) or a group of interconnected CPUs, or alternatively a dedicated processing unit, e.g. a signal processing unit. A memory module 905 may also be provided and may be used to store data, but may also be used to store a software program comprising instructions, which allows to use the processing unit 903 for various processing functions. E.g. it is possible that one network unit 901 under the control of a software program fulfils the function of the MSC 50 and at the same time the function of the SCP 58.

The invention facilitates that a UMA-subscriber may receive a call to geographic number only when she is currently served by UMA access. The method described by the invention achieves this object in efficient manner and without impact on or dependency on existing IN services.

The present invention has been explained above with reference to a number of exemplary embodiments. The present invention is not restricted to the use of WLAN for UMA. Alternatively, the Bluetooth for UMA technique may be used. As will be apparent to the person skilled in the art, various modifications and amendments can be made without departing from the scope of the present invention, as defined in the appended claims.

LIST OF ABBREVIATIONS

BSC Base Station Control
CAMEL Customised Applications for Mobile network Enhanced Logic
CAP CAMEL Application Part
CGI Cell global identifier
CI Cell identifier
GAN Generic access network
GANC Generic access network controller
GMSC Gateway Mobile services Switching Centre
GN Geographic number
GSM Global System for Mobile communication
IN Intelligent Networks
INAP IN Application Part
ISDN Integrated Services Digital Network
ISUP ISDN User Part
LAC Location area code
LAI Location area identifier
LAN Local Area Network
LI Location information
LSA Localised services area
MS Mobile Station
MSC Mobile services Switching Centre
MSISDN Mobile Subscriber ISDN Number
MSRN Mobile Station Roaming Number
PLMN Public land Mobile Network
RAN Radio access network
SAC service area code
SCP Service Control Point
SGSN Serving GPRS Support Node
SSF Service Switching Function
UMA Unlicensed Mobile Access
UNC UMA network controller
WLAN Wireless LAN

The invention claimed is:

1. A method of routing a call made to a fixed telephone number of a UMA-subscriber having at least one of a GSM/UMA subscription and a UMTS/UMA subscription, in a mobile telecommunications network comprising a first switching node and a service control entity, said method comprising:

associating a Location Area Code (LAC) or a combination of a LAC and cell identifier (CI) with each Generic Access Network Controller (GANC) of a group of GANCs;

receiving, by said service control entity, a trigger message sent by said first switching node, said trigger message including said fixed number of said UMA-subscriber;

upon receiving a trigger message, acquiring location information of said UMA-subscriber either by said service control entity or by said first switching node, said location information comprising at least one of a LAC, and a combination of LAC and cell identifier (LAC+CI) associated with a serving BSC or one of said GANCs serving said UMA-subscriber; and sending a connect message from the service control entity to the first switching node to connect the call to said UMA-subscriber when said LAC or said combination LAC+CI is associated with one of said group of GANCs.

2. The method of claim 1, wherein said mobile telecommunications network further comprises a location server, and said service control entity is connectable to said first switching node and to said location server, said method further comprising:
receiving said location information from said location server;
sending a connect message to said first switching node in order to connect the call to said UMA-subscriber when said LAC or said combination LAC+CI is associated with said one of said group of GANCs.

3. The method of claim 2, further comprising:
storing a list comprising an MSISDN and a related fixed number for said UMA-subscriber;
finding a specific MSISDN associated with said fixed number using said list;
sends a query message to said location server, said query message comprising said specific MSISDN; and
receiving a response message from said location server, said response message comprising said location information.

4. The method of claim 1, further comprising:
receiving said location information from said first switching node in said trigger message when said location information is acquired by said first switching node; and
sending a connect message to said first switching node in order to connect the call to said UMA-subscriber when said LAC or said combination LAC+CI is associated with said one of said group of GANCs.

5. The method of claim 1, wherein said mobile telecommunications network further comprises a location server, said method further comprising:
receiving an ISUP IAM message, said ISUP IAM message comprising a called party number comprising said fixed telephone number and a routing prefix;
sending a MAP SRI message from said first switching node to said location server;
receiving subscription information and location information at said first switching node from said location server; and
sending a trigger message to said service control entity, using said received subscription information, said trigger message comprising said location information.

6. The method of claim 5, wherein said telecommunications network further comprising a Signaling Relay Function, said method further comprising:
storing, by said Signaling Relay Function, a list comprising a said fixed number and an associated location server for said UMA-subscriber;
receiving a MAP SRI message at said Signaling Relay Function from said first switching node, said MAP SRI message comprising said fixed telephone number;
forwarding the MAP SRI message from Signaling Relay Function to said location server associated with said fixed telephone number using said list;
receiving a MAP SRI result message from said location server, said MAP SRI result message containing subscription information and location information of said subscriber; and
forwarding said subscription information and location information to said first switching node.

7. A method of routing a call made to a fixed telephone number of a UMA-subscriber having a GSM/UMA subscription or a UMTS/UMA subscription, in a mobile telecommunications network comprising a first switching node, a second switching node and a location server, said method comprising:
associating a Location Area Code (LAC) or a combination of a LAC and cell identifier (CI) with each Generic Access Network Controller (GANC) of a group of GANCs;
receiving, at said location server, a MAP SRI message from said first switching node, said MAP-SRI message containing said fixed number of said UMA-subscriber;
sending responsive to said MAP-SRI message a MAP PRN message from said location server to said second switching node;
sending a UMA-specific LSA setting from said location server to said second switching node, said LSA setting indicating that the call to the UMA-subscriber is restricted to UMA access;
receiving a MAP PRN response message at said location server from said second switching entity responsive to said request message; and
sending a MAP-SRI response message to said first switching node to connect the call to said UMA-subscriber using a roaming number provided in said MAP PRN response message when said LAC or said combination LAC+CI is associated with one of said group of GANCs.

8. The method of claim 7, further comprising:
storing location information indicating a current location of said UMA-subscriber in a location database;
receiving said MAP PRN message from said location server, said MAP PRN message including said UMA-specific LSA setting indicating that the call is restricted to UMA access; and
sending a Mobile Station Routing Number (MSRN) to said location server if said location information indicates that said UMA-subscriber is currently under UMA access and is served by one of said GANCs in said group of GANCs.

9. The method of claim 8, said method further comprising:
receiving at said location server a MAP Location Update (LU) message or a MAP Restore Data (RD) message from said second switching node; and
sending a MAP ISD message to said second switching node responsive to said MAP-LU message or said MAP-RD message, said MAP ISD message including said UMA-specific LSA subscription information.

10. The method of claim 7, wherein said mobile telecommunications network further comprises a second switching node and a location server, said method further comprising:
receiving a MAP ISD message at said second switching node from said location server, said MAP ISD message including said UMA-specific LSA subscription information; and
sending a Mobile Station Routing Number (MSRN) to said location server if said location information indicates that said UMA-subscriber is currently under UMA access and is served by one of said GANCs in said group of GANCs.

11. The method of claim 1, wherein said service control entity:
runs an Intelligent Network (IN)-service;
receives location information of a UMA-subscriber in an Intelligent Network trigger message; and
uses the location information for its service logic processing.

12. The method of claim 11, wherein, if the subscriber is found to be under UMA access served by one of said group of GANCs, a home zone indicator is placed in a Call Detail Record, wherein said home zone indicator indicates to a billing system that the rate of the call must be adapted.

13. The method of claim 11, wherein said IN-service is a prepaid service or a VPN service.

14. The method of claim 1, wherein said service control entity is a Service Control Point and said first switching node is a Gateway MSC.

15. The method of claim 7, said method further comprising receiving at said location server a MAP-SRI message from said first switching node, said MAP-SRI message including said fixed number of said UMA-subscriber.

16. A service control entity for providing intelligent network services to users of a mobile telecommunications network, said mobile telecommunications network comprising a first switching node, a second switching node, a location server and a group of Generic Access Network Controllers, GANCs, each having its associated Location Area Code (LAC), said service control entity comprising:
 a processing unit;
 an input unit connected to the processing unit; and
 an output unit connected to the processing unit;
wherein said service control entity being connectable to said first switching node and to said location server, and wherein said processing unit is arranged to:
 associating a Location Area Code (LAC) or a combination of a LAC and cell identifier (CI) with each Generic Access Network Controller (GANC) of a group of GANCs;
 receive a trigger message from said first switching node via said input unit, said trigger message including said fixed number of said UMA-subscriber;
 receive location information of a UMA-subscriber via said input unit, said location information comprising at least one of a location area code (LAC) and a combination of location area code and cell identifier (LAC+CI) associated with a serving BSC or a serving GANC; and
 send, via said output unit, a connect message to said first switching node in order to connect the call to said UMA-subscriber when said LAC or said combination LAC+CI is associated with said one of a group of GANCs.

17. A switching node for use in a mobile telecommunications network, said mobile telecommunications network further comprising a service control entity, a location server, and a group of Generic Access Network Controllers (GANCs), each having an associated Location Area Code (LAC), said switching node comprising:
 a processing unit;
 an input unit connected to the processing unit; and
 an output unit connected to the processing unit;
wherein said switching node being connectable to said service control entity and to said location server, and wherein the processing unit is arranged to:
 receive an ISUP IAM message via said input unit, said ISUP IAM message comprising a called party number comprising a fixed telephone number of a UMA-subscriber and a routing prefix;
 send a MAP SRI message to said location server via said output unit;
 receive subscription information and location information from said location server via said input unit, said location information comprising a LAC or a combination of a LAC and cell identifier (LAC+CI) associated with a serving BSC or a serving Generic Access Network Controller (GANC);
 send a trigger message to said service control entity via said output unit, using said received subscription information, said trigger message comprising said location information.

18. A location server for use in a mobile telecommunications network, said mobile telecommunications network further comprising a first switching node, a second switching node, and a group of Generic Access Network Controllers (GANCs) each having an associated Location Area Code (LAC), said location server comprising:
 a processing unit;
 an input unit connected to the processing unit; and
 an output unit connected to the processing unit;
wherein said location server is being connectable to said first switching node and to said second switching node, and wherein the processing unit is arranged to:
 receive a MAP SRI message containing a fixed number of a UMA subscriber from said first switching node via said input unit;
 determine a UMA-specific LSA restriction for the UMA-subscriber based on said fixed number; and
 send a MAP PRN message to said second switching node via said output unit, and send a UMA-specific LSA setting to said second switching node, said UMA-specific LSA setting indicating that the call is restricted to UMA access and is served by one of said GANCs in said group of GANCs.

19. A switching node for use in a mobile telecommunications network, said mobile telecommunications network further comprising a first switching node, a location server, and a group of Generic Access Network Controllers (GANCs), each having an associated Location Area Code (LAC), said switching node comprising:
 a processing unit;
 an input unit connected to the processing unit; and
 an output unit connected to the processing unit;
wherein said switching node being connectable to said first switching node and to said location server, and wherein the processing unit is arranged to:
 receive a MAP PRN message from said location server via said input unit; and
 receive a UMA-specific LSA setting from said location server, said LSA setting indicating to said switching node that said call to said UMA-subscriber is restricted to UMA access;
 determining how to route said call to said UMA-subscriber by determining a Mobile Station Routing Number (MSRN) based on the UMA-specific LSA setting if said location information indicates that said UMA-subscriber is currently under UMA access and is served by one of said GANCs in said group of GANCs; and
 send the Mobile Station Routing Number (MSRN) to said location server.

20. The service control entity according to claim 16, wherein the processing unit is further configured to:
 store a list comprising an MSISDN and a related fixed number for said UMA-subscriber;
 receive a trigger message from said switching node, said trigger message comprising said fixed number;
 find a specific MSISDN associated with said fixed number using said list;
 send a query message to said location server, said query message comprising said specific MSISDN; and
 receive a response message from said location server, said response message comprising said location information.

21. The service control entity according to claim 16, wherein the processing unit is further configured to receive said location information from said first switching node is said trigger message.

22. The switching node according to claim 17 wherein said mobile telecommunications network further comprises a Signaling Relay Function and wherein said processing unit is further configured to send said MAP SRI message to said Signaling Relay Function for relaying to said location server.

23. The location server according to claim 18 wherein the processing unit is further configured to:
 store a list comprising the fixed number for said UMA-subscriber and a related MSISDN; and
 use said list to determine said MSISDN number for the UMA-subscriber.

24. The location server according to claim 18 wherein the processing unit is further configured to send the LSA setting to the second switching node in said MAP PRN message.

25. The location server according to claim 18 wherein the processing unit is further configured to:
 receive a MAP Location Update (LU) message or a MAP Restore Data (RD) message from said second switching node; and
 send a MAP ISD message to said second switching node responsive to said MAP-LU message or said MAP-RD message including said UMA-specific LSA setting.

26. The switching node according to claim 19 wherein the processing unit is further configured to:
 send a MAP Location Update (LU) message or a MAP Restore Data (RD) message to said location server; and
 receive a MAP ISD message responsive to said MAP LU message of MAP RD message from said location server, said MAP-LU message or said MAP-RD message including said UMA-specific LSA setting.

27. The switching node according to claim 19 wherein the processing unit is further configured to receive said UMA-specific LSA setting in said MAP PRN message.

\* \* \* \* \*

UNITED STATES PATENT AND TRADEMARK OFFICE
CERTIFICATE OF CORRECTION

| | | |
|---|---|---|
| PATENT NO. | : 8,611,880 B2 | Page 1 of 1 |
| APPLICATION NO. | : 12/668781 | |
| DATED | : December 17, 2013 | |
| INVENTOR(S) | : Noldus | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 566 days.

Signed and Sealed this
Eleventh Day of March, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,611,880 B2 | Page 1 of 3 |
| APPLICATION NO. | : 12/668781 | |
| DATED | : December 17, 2013 | |
| INVENTOR(S) | : Noldus | |

It is certified that error appears in the above-identified patent and that said Letters Patent is hereby corrected as shown below:

The title page showing the illustrative figure should be deleted to be replaced with the attached title page.

In the Drawings:

In Fig. 1, Sheet 1 of 6, delete "Fig" and insert -- Fig. --, therefor at each occurrence throughout the drawings.

In Fig. 2, Sheet 1 of 6, for Tag "44", in Line 1, delete "Local Exchance" and insert -- Local Exchange --, therefor.

In Fig. 3, Sheet 2 of 6, for Tag "44", delete "Local Exchance" and insert -- Local Exchange --, therefor. (See Attached Sheet)

In the Specification:

In Column 4, Line 65, delete "address" and insert -- address. --, therefor.

In the Claims:

In Column 13, Line 52, in Claim 6, delete "a said" and insert -- said --, therefor.

In Column 14, Line 6, in Claim 7, delete "(Cl)" and insert -- (CI) --, therefor.

Signed and Sealed this
Twenty-ninth Day of July, 2014

Michelle K. Lee
*Deputy Director of the United States Patent and Trademark Office*

(12) United States Patent
Noldus

(10) Patent No.: US 8,611,880 B2
(45) Date of Patent: Dec. 17, 2013

(54) ROUTING CALL TO UMA-CAPABLE TERMINALS USING A GEOGRAPHIC NUMBER

(75) Inventor: Rogier Noldus, BM Goirle (NL)

(73) Assignee: Telefonaktiebolaget LM Ericsson (PUBL), Stockholm (SE)

(*) Notice: Subject to any disclaimer, the term of this patent is extended or adjusted under 35 U.S.C. 154(b) by 426 days.

(21) Appl. No.: 12/668,781

(22) PCT Filed: Jul. 13, 2007

(86) PCT No.: PCT/NL2007/050351
§ 371 (c)(1),
(2), (4) Date: Jan. 19, 2010

(87) PCT Pub. No.: WO2009/011564
PCT Pub. Date: Jan. 22, 2009

(65) Prior Publication Data
US 2010/0297989 A1 Nov. 25, 2010

(51) Int. Cl.
*H04M 3/32* (2006.01)

(52) U.S. Cl.
USPC ........ 455/417; 455/426.1; 455/411; 370/356; 370/395.2; 719/313

(58) Field of Classification Search
USPC ............. 455/417, 432.1, 426.1, 456.1, 436, 455/435.1, 67.11, 161.1, 166.1, 411, 410; 370/338, 328, 331, 332, 395.31, 407, 370/432, 492, 465, 437, 395.2, 356; 711/144, 119, 141, 148, 145; 709/215, 709/213, 216; 726/2, 8; 719/313
See application file for complete search history.

(56) References Cited

U.S. PATENT DOCUMENTS

| | | | | |
|---|---|---|---|---|
| 5,758,281 | A * | 5/1998 | Emery et al. | 455/428 |
| 6,434,126 | B1 * | 8/2002 | Park | 370/328 |
| 7,639,647 | B2 * | 12/2009 | Dantu et al. | 370/331 |
| 7,640,008 | B2 * | 12/2009 | Gallagher et al. | 455/414.1 |
| 8,032,133 | B2 * | 10/2011 | Niemela et al. | 455/426.1 |
| 8,064,882 | B2 * | 11/2011 | Shatzkamer et al. | 455/411 |
| 2006/0172732 | A1 * | 8/2006 | Nylander et al. | 455/433 |
| 2006/0205404 | A1 * | 9/2006 | Gonen et al. | 455/432.1 |

(Continued)

FOREIGN PATENT DOCUMENTS

| | | |
|---|---|---|
| EP | 1804435 A1 | 7/2007 |
| WO | 9742771 A2 | 11/1997 |

(Continued)

*Primary Examiner* — Mahendra Patel
(74) *Attorney, Agent, or Firm* — Coats and Bennett, P.L.L.C.

(57) ABSTRACT

The invention relates to a method of routing a call made to a fixed telephone number of a UMA-subscriber in a mobile telecommunications network comprising a first and a second switching node and a location server. Location information of said UMA-subscriber is acquired wherein said location information comprises a location area code or a combination of location area code and cell identifier associated with a serving BSC or a serving GANC. The call is connected to the UMA-subscriber when the location area code or combination of location area code and cell identifier is associated with one of a group of GANCs, or connected to an alternative destination, such as a voicemail service, if the location area code or combination of location area code and cell identifier is not associated with said one of a group of GANCs. The methods described in the present invention disclosure allow for very efficient offering of UMA in combination with geographic numbers.

27 Claims, 6 Drawing Sheets

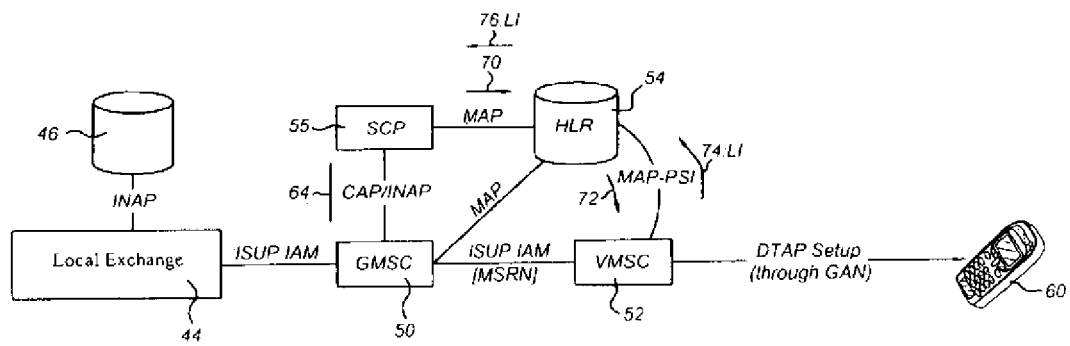

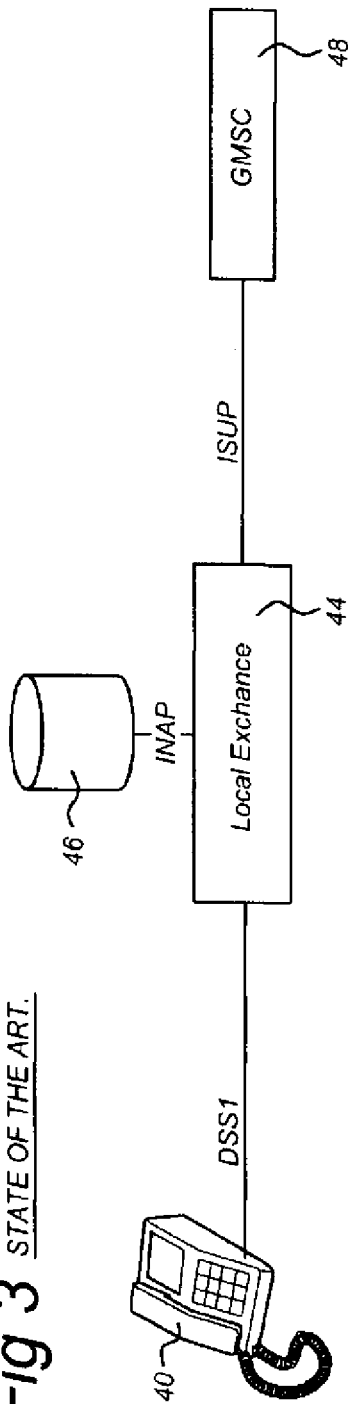
Fig 3 STATE OF THE ART.
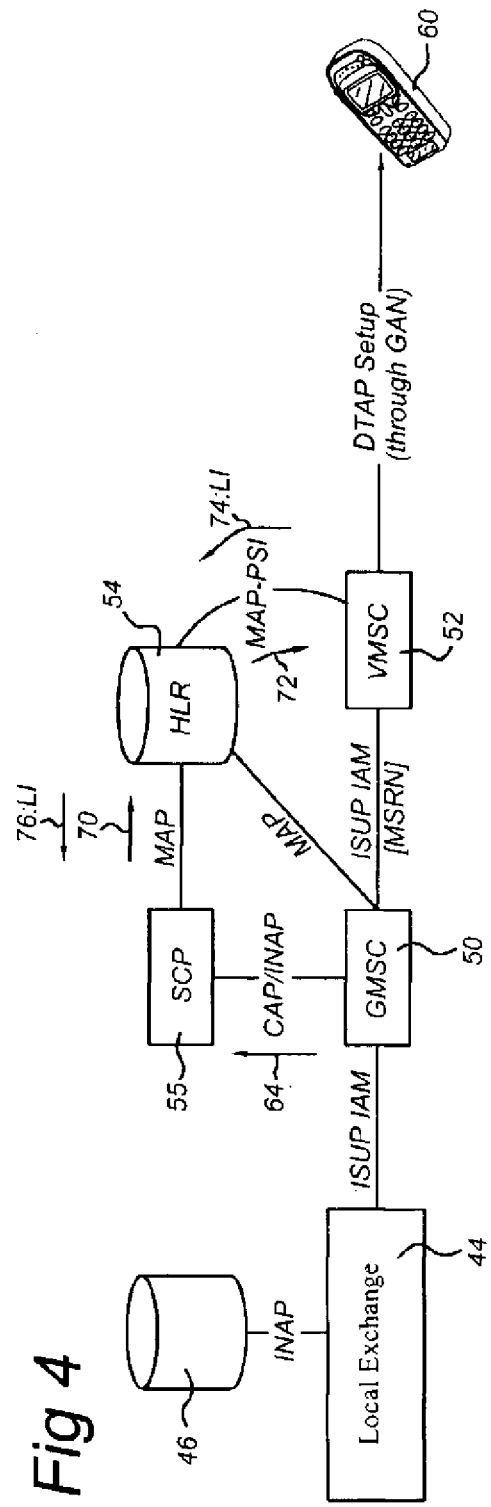
Fig 4